(12) United States Patent
Szymanski et al.

(10) Patent No.: US 6,481,477 B1
(45) Date of Patent: Nov. 19, 2002

(54) FENCE ASSEMBLY FOR A ROUTER TABLE

(75) Inventors: Donald M. Szymanski, Prospect, KY (US); Leroy R. Leet, Shelbyville, KY (US); Gregory A. Phillips, LaGrange, KY (US); W. Miles Hale, Louisville, KY (US)

(73) Assignee: Credo Tool Company, Woodburn, OR (US)

( * ) Notice: Subject to any disclaimer, the term of this patent is extended or adjusted under 35 U.S.C. 154(b) by 0 days.

(21) Appl. No.: 10/037,494

(22) Filed: Jan. 3, 2002

(51) Int. Cl.[7] .................. B27B 31/00; B27B 27/00; B27H 1/02
(52) U.S. Cl. .................. 144/371; 83/468.7; 144/135.2; 144/253.2; 144/286.1; 269/303; 269/315
(58) Field of Search .................. 83/468.3, 468.7, 83/468.2; 144/135.2, 253.1, 253.2, 286.1, 286.5, 371; 269/303, 306, 315; 409/218, 226

(56) References Cited

U.S. PATENT DOCUMENTS

| | | |
|---|---|---|
| D342,658 S | 12/1993 | Gakhar et al. .................. D8/71 |
| 5,443,554 A | 8/1995 | Robert .................. 83/468 |
| 5,768,966 A | 6/1998 | Duginske .................. 83/468.7 |
| 5,779,407 A | 7/1998 | Tucker et al. .................. 409/218 |
| 5,890,524 A | 4/1999 | Tucker et al. .................. 144/371 |
| 6,095,024 A | 8/2000 | Brutscher et al. .................. 83/35 |

Primary Examiner—W. Donald Bray
(74) Attorney, Agent, or Firm—Greer, Burns & Crain, Ltd.

(57) ABSTRACT

A fence assembly for use with a router table, with the fence assembly including a first lower rail, a second lower rail and an upper rail. The first lower rail is configured and arranged to be positioned above the router table, where the first lower rail defines a lower longitudinal axis along the length thereof. The second lower rail is configured and arranged to be positioned above the router table along the lower longitudinal axis. The upper rail is configured and arranged to be attached to the router table above both the first lower rail and the second lower rail, whereby the upper rail defines an upper longitudinal axis that is substantially parallel to the lower longitudinal axis. One important feature of the present invention is that at least one of the first lower rail and the second lower rail is configured and arranged to be moved between a normal position, in which the front sides of said first and second lower rails are substantially flush with each other, and a shifted position, in which the front side of the first and second lower rails are slightly offset from each other. Such a shifted position allows the router to be used as an edge jointer.

20 Claims, 4 Drawing Sheets

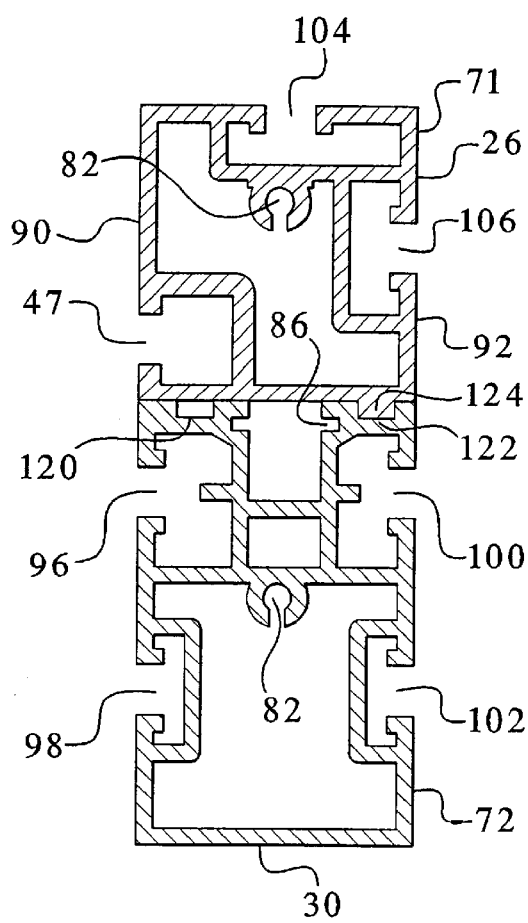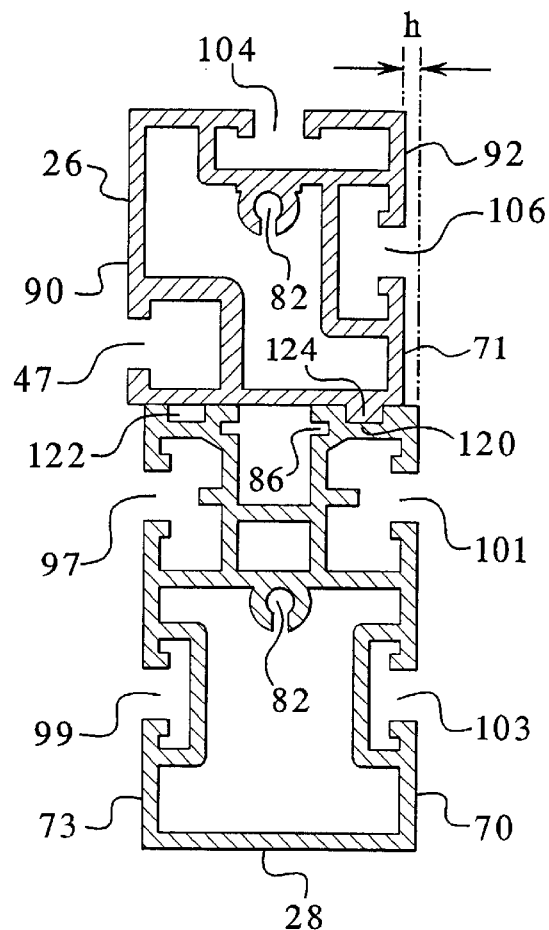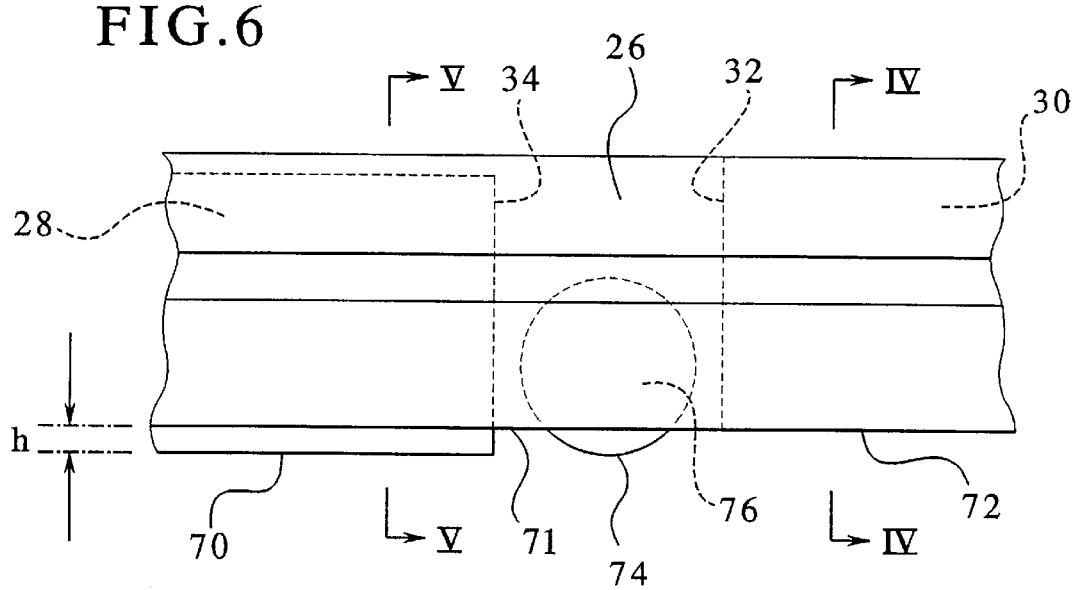

FENCE ASSEMBLY FOR A ROUTER TABLE

The present invention relates generally to a fence assembly for use in guiding a workpiece along a table to a processing area, and more particularly to a fence assembly for use with a router in which the fence assembly may be easily reoriented so that the router may be used as an edge jointer.

BACKGROUND OF THE INVENTION

As is known in the woodworking art, routers are tools that are commonly used for cutting moldings and profiles, as well as for shaping, duplicating, and trimming, among other uses. Two general types of routers are known: (1) those in which the router is moved relative to the workpiece; and (2) those in which the workpiece is moved relative to the router. It is this second type of router, along with its associated table, that is the subject of the present invention.

Routers in which the workpiece is moved relative to the router generally include a router bit or cutter that is attached to a motor for rotating the cutter. Normally, the router bit extends upwardly from a table, and the workpiece is guided along the table and into the router bit, which performs the routing operation. In order to better guide the workpiece along towards the router bit, a stationary fence is normally affixed to the table. The location of the fence is preferably adjustable so that the desired area of the workpiece can be cut or shaped by the rotating router bit. After the fence is adjusted to the desired location, the operator slides the workpiece along the stationary fence and into the rotating router bit, which is located at the desired position in front of the fence.

Routers are often used as edge jointers for putting a straight edge upon the workpiece. One method of converting the router into an edge jointer involves affixing a strip of laminate to a portion of the fence. More specifically, a thin strip of laminate is attached to the outfeed side (i.e., the left side) of the fence assembly. The workpiece is then guided along the fence from the infeed side, through the rotating router bit (which has been positioned just a slight distance away from the front face of the infeed side of the fence), and towards the outfeed side. Preferably, the surface of the laminate is aligned to be flush with the outermost edge of the router bit, which results in the cut produced being equal to the thickness of the laminate. Thus, the use of the laminate enables the operator to produce a straight edge because the cut edge is properly guided along the laminate that has been affixed to the outfeed side of the fence.

Although the use of such a configuration may produce satisfactory results, there is a danger that the laminate may separate from the fence, especially since the laminate is normally just affixed to the fence with carpet tape of other similar temporary adhesive. Accordingly, there is a need for a more stable configuration and a method of reconfiguring a router fence assembly so that it may be used as an edge jointer. Such a device and method should enable the operator to quickly and easily convert the router into an edge jointer, where the resulting fence assembly is securely maintained in the jointing state.

BRIEF SUMMARY OF THE INVENTION

Briefly, the present invention provides a fence assembly for use with a router table, with the fence assembly including a first lower rail, a second lower rail and an upper rail. The first lower rail is configured and arranged to be seated below the upper rail, where the first lower rail defines a lower longitudinal axis along the length thereof. The second lower rail is also configured and arranged to be seated below the upper rail. The upper rail is configured and arranged to be attached to the router table through the use of an L-bracket, whereby the upper rail defines an upper longitudinal axis that is substantially parallel to the lower longitudinal axis. One important feature of the present invention is that at least one of the first lower rail and the second lower rail is configured and arranged to be moved between a normal position, in which the front sides of said first and second lower rails are substantially flush with each other, and a shifted position, in which the front side of the first and second lower rails are slightly offset from each other.

Preferably, the movement between the normal position and the shifted position involves the rotation of the first lower rail. Additionally, the offset position is preferably a position in which the front side of the first lower rail is aligned with the front edge of the router bit, where both the front edge of the router bit and the front side of the first lower rail are positioned forward a slight distance from the front side of the second lower rail. In other words, with the first lower rail in the offset position, the outfeed side of the fence is set forward a slight distance from the infeed side of the fence. In the alternative, a configuration is also contemplated in which the infeed side of the fence assembly is movable such that it's front edge is positioned a slight distance behind the front edge of the outfeed side of the fence assembly.

The present invention also provides for a combination of the fence assembly described above and a table, as well as for a method of reconfiguring a router table fence assembly between a normal position and a shifted position.

BRIEF DESCRIPTION OF THE SEVERAL VIEWS OF THE DRAWINGS

Preferred embodiments of the present invention are described herein with reference to the drawings wherein:

FIG. 4 is a cross-sectional view of the upper rail and one of the lower rails taken along lines IV—IV of FIG. 6, showing the lower rail in the normal position;

FIG. 5 is a cross-sectional view of the upper rail and one of the lower rails taken along lines V—V of FIG. 6, showing the lower rail in the shifted position; and FIG. 6 is a top view of the upper rail with one of the lower rails in the shifted position, showing how the front of one of the lower rails extends forward of the front of the other lower rail and the upper rail.

DETAILED DESCRIPTION OF THE INVENTION

Figure 1:
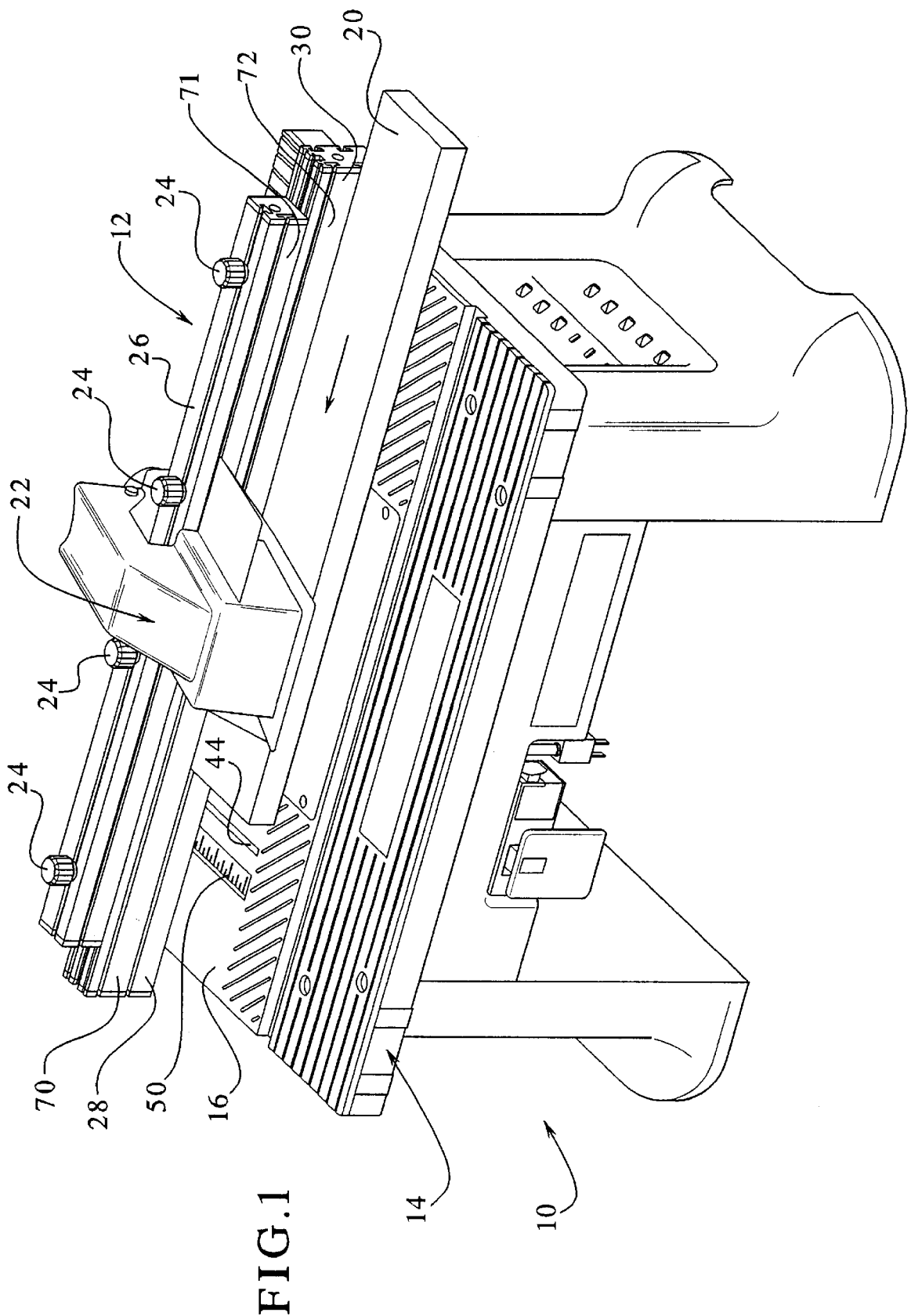
FIG. 1 is a front perspective view of the present fence assembly, shown positioned upon a router table.

Referring now to the figures, FIG. 1 shows an example of a router and table assembly 10, including a preferred embodiment of the fence assembly 12 of the present invention. Briefly, the router and table assembly 10 includes a table 14 with a generally flat upper surface 16. Seated upon the flat upper surface 16 of the table 14 is a workpiece 20, which may comprise a piece of wood. During the routing operation, the workpiece 20 is pushed by the operator in the direction of the arrow. The operator slides the edge of the workpiece 20 along the front side of the fence assembly 12 so that the rear edge of the workpiece makes contact with the rotating router bit (not shown). The rotating router bit is located below the guard 22, which serves to protect the operator from making contact with the rotating router bit, and also serves as a means for collecting and removing the dust generated when the rotating bit cuts into the workpiece 20.

Figure 2:
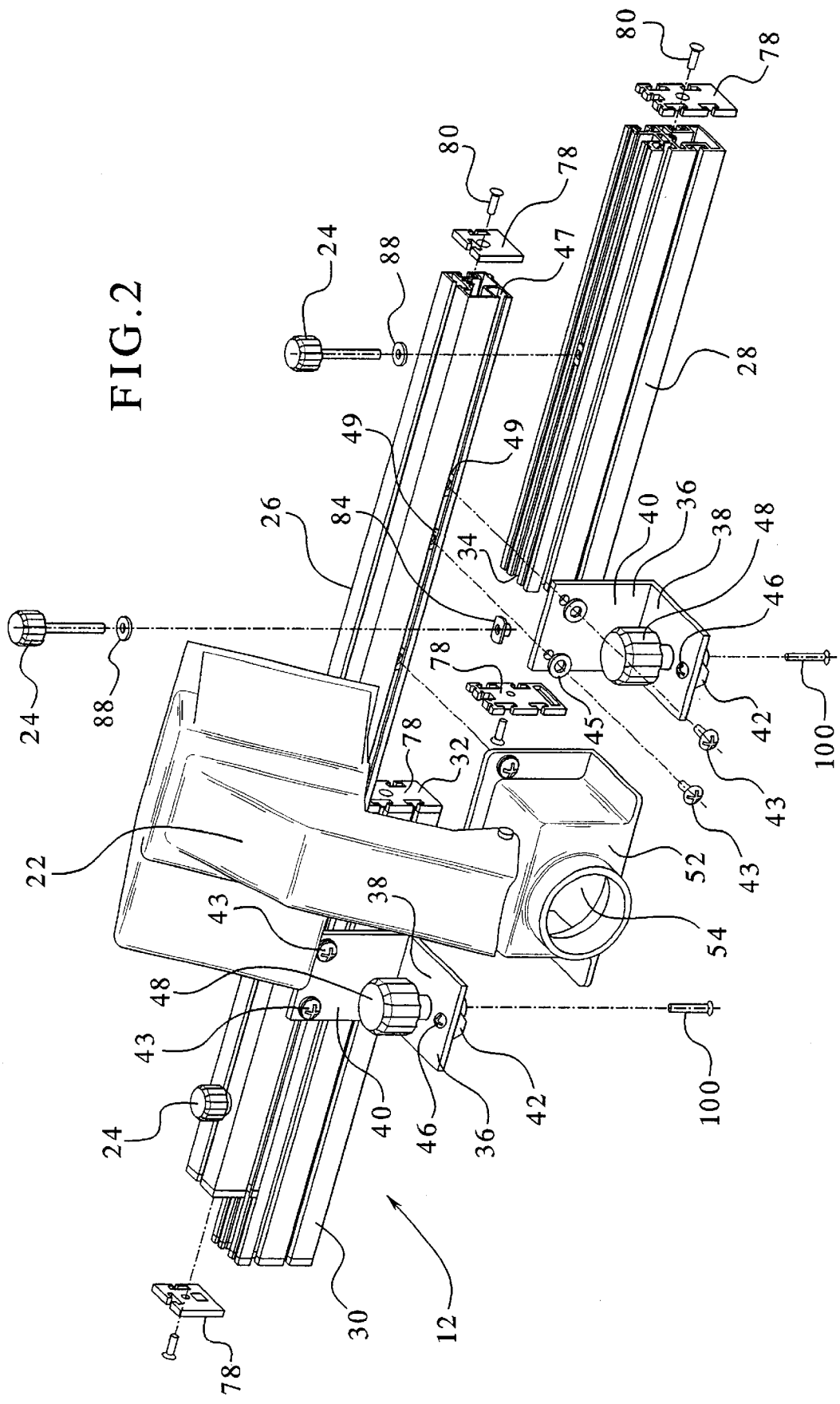
FIG. 2 is a partially exploded rear view of the present fence assembly, shown with the guard and dust protector in the open position.

Turning now to FIG. 2, a rear view of the fence assembly 12 and the guard 22 can be seen. The main components of the fence assembly 12 include the upper rail 26, and two lower rails, which will be designated as the first lower rail 28 and the second lower rail 30. The first lower rail 28 and the second lower rail 30 are preferably configured and arranged so that they can be slid in the longitudinal direction with respect to the upper rail 26. Accordingly, a space can be created between the inner end 32 of the second lower rail 30 and the inner end 34 of the first lower rail 28. This space, which can be varied in length by sliding the first and second lower rails with respect to each other, is preferably positioned near the center of the fence assembly so that the router bit (not shown) is aligned with the center of this space.

As explained more fully below, the lower rails 28 and 30 are preferably attached to the upper rail 26 with a plurality of fence clamping knobs 24. The upper rail 26 is affixed to the table 14 via a plurality of L-brackets 36 (see FIG. 2), as also explained more fully below. Since the lower rails 28 and 30 are affixed to the upper rail 26 via fence clamping knobs 24, and the upper rail 26 is attached to the table 14 via the L-brackets 36, the lower rails 28 and 30 are maintained in the desired position with respect to the table, but they are only indirectly attached to the table.

Before explaining the details of how the first lower rail 28, the second lower rail 30 and the upper rail 26 are affixed to each other and to the table 14, and explanation will be provided of how the fence assembly 12 can be simply reconfigured so that the router can be used as an edge jointer. As best seen in FIG. 2, the first lower rail 28 and the second lower rail 30 are completely separate components from each other. Accordingly, they can be moved independently of each other, either by sliding them longitudinally below the upper rail 26, or even by completely removing either the first lower rail 28 or the second lower rail 30 (or both) from the fence assembly 12. Even if both the lower rails 28 and 30 are removed from the fence assembly 12, the upper rail 26 can remain attached to the table 14 because, as can be seen in FIG. 2, the L-brackets 36 only connect the upper rail 26 to the table 12, without being attached to the lower rails 28 and 30. Thus, the upper rail 26 is maintained in position by being suspended above the flat upper surface 16 of the table 14. In contrast, the lower rails 28 and 30 are secured in position via fence clamping knobs 24, which simply attach the lower rails (28, 30) and the upper rail 26 together.

When normal routing operations are desired, the front face 70 (see FIG. 1) of the first lower rail 28 is arranged to be aligned with the front face 72 of the second lower rail 30. Accordingly, both the infeed portion of the fence (i.e., the right-hand side as shown in FIG. 1) and the outfeed portion of the fence (i.e., the left-hand side as shown in FIG. 1) are aligned with the front faces (70, 72) of the lower rails (28, 30) being substantially flush with each other.

When the user desires to use the router as an edge jointer, lower rail 28 is moved into a shifted position such that the front faces (70, 72) of the first lower rail 28 and the second lower rail 30 are slightly offset from each other. As best seen in FIG. 6, which is a top view of the upper rail 26 with the first lower rail 28 shown in the shifted position, the front face 70 of the first lower rail 28 is offset from the front face 72 of the second lower rail 30 by a distance designated as "h." It should be noted that in the FIG. 6 view, the upper surface of the upper rail 26 is shown in solid lines, and the inner end 34 of the first lower rail 28 and the inner end 36 of the second lower rail 30 are shown in hidden lines because the lower rails 28 and 30 are hidden beneath the upper rail 26. However, the front face 70 of the first lower rail 28 is shown in solid lines because it projects outwardly from the front face 71 of the upper rail 26 (as can be seen on the right-hand side of FIG. 5). The front face 72 of the second lower rail 30 also appears to be represented by a solid line because it coincides with the front face 71 of the upper rail 26 (as can be seen on the right-hand side of FIG. 4). Preferably, when the first lower rail 28 is in the shifted position, its front face 70 is aligned with the front face 74 of the router bit 76. With this configuration, the router can be used as an edge jointer.

One of the important aspects of the present invention is that one of the lower rails can be easily changed from the normal position to the shifted position, and that the lower rail that is subject to being shifted can be safely, securely and consistently maintained in either position. To change from the normal position to the shifted position, the fence clamping knobs 24 are loosened, and the shafts of the knobs are sufficiently lifted to enable the user to slide the first lower rail 28 out of contact with the upper rail 26, and away from the fence assembly 12. Then the first lower rail 28 is rotated by 180°, and it is slid back into position below the upper rail 26. Finally, the fence clamping knobs 24 are lowered and tightened, once again securing the first lower rail 28 and the upper rail 26 together. Due to the unique seating arrangement for mating the lower rails with the upper rail, as described more fully below, which includes a key on one component and two grooves on the mating surfaces, the lower rails are properly positioned, with their front faces being either flush with each other or being slightly offset from each other, depending upon which one of the two grooves the key is seated within.

While only one example of the present invention is shown and described, it should be noted that many variations on the basic concept are contemplated as being within the scope of the invention. For example, the second lower rail may be the rail that is rotated (instead of rotating the first lower rail), such that its front face is positioned behind the front face of the first lower rail; the rotation may be a 180° rotation about a horizontal axis (instead of about a vertical axis as shown and described); or an embodiment is also envisioned in which the upper rail is rotated so that an overhang on a portion of upper rail creates the offset.

The preferred embodiment for attaching the fence assembly to the table will be described next. In this embodiment, the upper rail 26 is attached to the table 14 (as seen in FIG. 1) via two of the L-brackets 36 (although more L-brackets may also be used). Preferably, the L-brackets 36 are positioned on the rear of the fence assembly 12 so that they do not interfere with the movement of the workpiece along the fence. The L-brackets 36 each include a horizontal leg 38 and a vertical leg 40. As shown in FIG. 2, the vertical legs 40 each include two holes 41 for receiving two screws 43. This pair of screws 43 are driven into a slot 47, within which are seated a pair of nuts 49 (also shown in FIG. 3) for securing the screws 43 to the upper rail 26. Optionally, washers 45 may also be provided between the screws 43 and the surface of the vertical leg 40.

A guide bar 42 is preferably affixed to the bottom of the horizontal leg 38 of each L-bracket 36. Each guide bar 42 is configured to be seated within one of the pair of guide slots 44 (only one of which is visible in FIG. 1 because the other guide slot is hidden under the workpiece 20). The guide bar 42 and guide slot 44 configuration guide the fence assembly 12 along a straight path in the forward and reverse directions (i.e., perpendicular to the longitudinal axis of the fence assembly 12). Each guide bar 42 is preferably affixed to its associated L-bracket 36 via a pair of screws 46, which are securely maintained in position via a pair of nuts (not shown).

The L-brackets 36 are secured to the table with securing knobs 48. These securing knobs 48 each include a threaded insert. The threaded insert preferably terminates on a bolt 100 that extends from below a slot in the router table, into a slot within the guide slot 44 and through the L-bracket 36, for keeping the securing knob from separating from the table 14. Thus, when the position of the fence 12 needs to be adjusted, the securing knobs 48 are loosened, and the fence is moved so that the guide bar 42 slides within the guide slot 44. Optionally, an indicator 50 (FIG. 1) with measurements thereon may also be included on the upper surface 16 of the table 14 so that the user can easily determine the distance of the fence 12 from the router bit. FIG. 2 also shows a pivotable guard 22 and a dust collector 52. The guard 22 prevents the user from being injured by contacting the rotating router bit, which is seated below the guard when the guard is pivoted into the operating position shown in FIG. 1. The guard 22 should be made of a transparent material so that the user can see the cutting operation being performed by the rotating router bit. The dust collector 52 includes an opening 54 that is preferably connected to a vacuum hose, so that the dust created when the rotating router bit cuts the wood is removed from the area by the vacuum.

Figure 3:
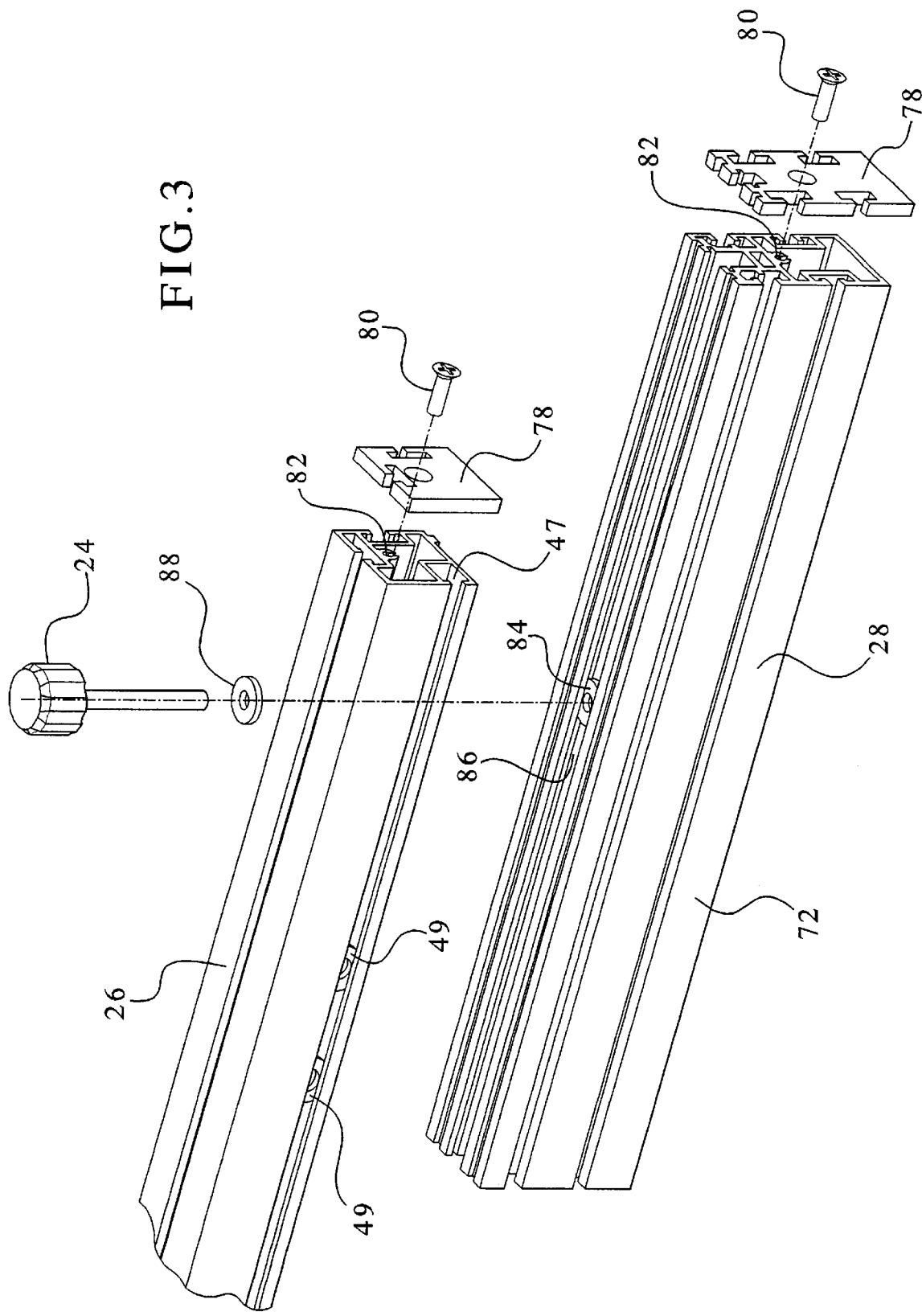
FIG. 3 is an exploded back view of one of the lower rails and a portion of the upper rail.

In order to give the rails a more finished appearance, as well as to prevent the collection of dust therein, an endcap 78 is preferably affixed to the end of each of the rails (26, 28, 30). As best shown in FIG. 3, each endcap 78 is preferably attached to each of the ends of the rails (26, 28, 30) by screwing a screw 80 into a corresponding aperture 82. Of course, other means of affixing the endcaps to the rails are also contemplated as being within the scope of the invention.

While continuing to refer to FIG. 3, as well as to FIG. 2, an explanation of the manner in which the fence clamping knobs 24 operate will be described. Each fence clamping knob 24 is designed to cooperate with an associated weld nut 84. The weld nuts 84 are shaped to be seated within a T-slot 86 (see also FIGS. 4 and 5) found within each of the lower rails (28, 30). 29 As can be seen in FIG. 2, the weld nuts 84 are specially shaped with a pair of opposing flat side edges that prevent the nut from rotating within the T-slot 86, but while still allowing the nut to slide in the longitudinal direction within the T-slot 86. Preferably, a washer 88 is also provided between each fence clamping knob 24 and the upper surface of the upper rail 26. To clamp the lower rails (28, 30) to the upper rail 26, the threaded shank of the clamping knob 26 is pushed through a hole in the upper rail 26, the weld nut 84 is placed into the T-slot 86, and it is slid to the desired position that is aligned with the threaded shank, and the knob 26 is the tightened into place within the nut. If the knobs 24 are loosened and lifted slightly out of contact with the lower rails, the lower rails may be slid with respect to the upper rail. It should be noted that although four fence clamping knobs 24 are shown in the figures, more knobs or less knobs may be utilized if desired.

Turning now to FIGS. 4 and 5, one example of cross-sections for the upper and lower rails is shown in FIGS. 4 and 5. More specifically, FIG. 4, which is a cross-section taken along line IV—IV in FIG. 6, shows the second lower rail 30 and the upper rail 26. FIG. 5 is a cross-section taken along line V—V of FIG. 6, showing the first lower rail 28 in the shifted position (and the upper rail 26 in its only position). When the first lower rail 28 is positioned in the normal position, a cross-section through the first lower rail 28 would look the same as the cross-section through the second lower rail 30 of FIG. 4 because the front edges of both lower rails are flush with each other.

As can be seen in FIGS. 4 and 5, the upper and lower rails include an assortment of slots extending longitudinally along the entire length of the rails. In particular, the upper rail 26 includes the slot 47, as mentioned above, on its rear face 90 for receiving the nuts 49 (shown in FIGS. 2 and 3) used for securing the L-bracket 36 to the upper rail 26. The front face 92 of the upper rail 26 may optionally include another slot 106, which may be used for attaching accessories, such as hold-down devices and shields, to the fence. Similarly, both the front and rear faces of the lower rails (28, 30), as well as the top, front and rear faces of the upper rail 26, may include a plurality of other slots (96–104) for the same purpose.

One of the important features of the present invention is the use of a seating arrangement for allowing the lower rail to be seated below the upper rail in a consistent manner. In the preferred embodiment, this seating arrangement includes two slots in the upper surface of the lower rails, and a single key on the lower surface of the upper rail. For example, FIG. 4 shows the second lower rail 30 with two slots 120 and 122 therein. This figure also represents the first lower rail 28 in the normal position, because the second lower rail 30 is essentially positioned in an identical manner to the first lower rail 28 when the first lower rail is in the normal position. As can be seen in FIG. 4, when a key 124 formed on the lower surface of the upper rail 26 is seated within the first slot 122, the front and rear sides of the upper rail 26 and the second lower rail 30 are flush with each other.

Turning now to FIG. 5, the first lower rail 28 has been rotated by 180° into the shifted position, whereby the key 124 is now seated in the second slot 120. Since the second slot 120 is farther from the front face 70 than the first slot 122 is from the rear face 73, the front face of the lower rail ends up being slightly shifted from the front face 71 of the upper rail 26 by a distance "h." Because the front face 71 of the upper rail 26 is flush with the front faces of both the lower rails when the first lower rail is in the normal position and when the second lower rail is in its only position, this distance "h" is the same distance for the offset between the first lower rail in the shifted position and the second lower rail in its only position, as shown in FIG. 6. The use of such dual slots 120 and 122 that are asymmetric from the edges enables the user to be assured that the lower rails are either flush with each other or are positioned in the desired offset that is consistently the same distance "h: time after time, and also enables the user to simply change between the normal position (such as for routing) and the offset position (such as for edge jointing). When in the edge jointer position, the length of the space between the first lower rail 28 and the second lower rail 30 will be just slightly larger than the width of the router bit so that the inner ends of the lower rails (32, 34) are positioned as close to the router bit as possible, without contacting the rotating bit, of course.

It should be noted that the cross-sectional configurations shown in FIGS. 4 and 5 are examples of generally hollow cross-sections that combine sufficient rigidity with a minimal use of material. These rails (26, 28, 30) are preferably made from extruded aluminum, although other materials (such as other metals or plastics), as well as other methods of fabrication are also contemplated as being within the scope of the invention.

It should also be understood, that other methods of attaching the fence to the table are also contemplated as being within the scope of the invention. Additionally, other optional features may also be added to the fence of the present invention. For example, the infeed edges of the first lower rail 28 may be radiused, or chamfered, to facilitate the movement of the workpiece. Additionally, either the front face or the rear face of the first lower rail may include some form of markings (such as additional grooves) to indicate to the user when the rail is in the normal position or the shifted position.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

What is claimed is:

1. A fence assembly for use with a router table, said fence assembly comprising:
    a first lower rail configured and arranged to be positioned above a router table, said first lower rail defining a lower longitudinal axis along the length thereof;
    a second lower rail configured and arranged to be positioned above a router table along said lower longitudinal axis;
    said first lower rail and said second lower rail each including a front side that is configured and arranged to face a workpiece; and
    an upper rail configured and arranged to be attached to a router table above both said first lower rail and said second lower rail, whereby said upper rail defines an upper longitudinal axis that is substantially parallel to said lower longitudinal axis;
    wherein at least one of said first lower rail and said second lower rail is configured and arranged to be moved between a normal position in which said front sides of said first and second lower rails are substantially flush with each other, and a shifted position in which said front sides of said first and second lower rails are slightly offset from each other.

2. The fence assembly according to claim 1, wherein said offset is created by having said front side of said first lower rail define a first line that is slightly forward of a line defined by said front side of said second lower rail.

3. The fence assembly according to claim 1, wherein said movement of at least one of said first lower rail and said second lower rail between a normal position and a shifted position comprises a rotational movement.

4. The fence assembly according to claim 3, wherein said rotation of at least one of said first lower rail and said second lower rail comprises full 180° rotation of said first lower rail such that locations of said front side and a rear side of said first lower rail are reversed.

5. The fence assembly according to claim 4, wherein said front side of said first lower rail is configured differently from said rear side of said first lower rail to indicate to the user whether said first lower rail is positioned in said normal position or in said shifted position.

6. The fence assembly according to claim 1 wherein:
    said movement between said normal position and said shifted position includes rotation of said first lower rail; and
    said first lower rail and said upper rail include a cooperating seating arrangement that includes dual slots and a single key for seating said first lower rail in either the normal position or the shifted position.

7. The fence assembly according to claim 6 wherein said cooperating seating arrangement includes:
    said dual slots being located in said first lower rail, and extending in a generally longitudinal direction along an upper face of said first lower rail; and
    said single key being located in said upper rail, extending in a generally longitudinal direction and being offset from a central axis of a lower face of said upper rail.

8. The fence assembly according to claim 1, further comprising:
    affixing means for attaching said first and second lower rails to said upper rail;
    wherein said affixing means is configured and arranged to allow at least one of said first and second lower rails to slide along said lower longitudinal axis with respect to said upper until said affixing means is tightened.

9. The fence assembly according to claim 8, wherein said affixing means comprises a nut/bolt arrangement that is configured to fit within a T-slot that is located in each of said first and second lower rails.

10. The fence assembly according to claim 1, wherein:
    said first and second lower rails and said upper rail each include a generally hollow cross-section; and
    said first lower rail and said second lower rail are capable of being longitudinally spaced apart from each other.

11. A router table and fence assembly comprising:
    a router table upon which a workpiece may be positioned;
    a fence assembly configured and arranged for guiding the workpiece towards a router bit, wherein said fence assembly includes:
        a first lower rail configured and arranged to be positioned above the router table, said first lower rail defining a lower longitudinal axis along the length thereof;
        a second lower rail configured and arranged to be positioned above the router table along said lower longitudinal axis;
        said first lower rail and said second lower rail each including a front side that is configured and arranged to face a workpiece; and
        an upper rail configured and arranged to be attached to the router table above both said first lower rail and said second lower rail, whereby said upper rail defines an upper longitudinal axis that is substantially parallel to said lower longitudinal axis;
        wherein at least one of said first lower rail and said second lower rail is configured and arranged to be moved between a normal position, in which said front sides of said first and second lower rails are substantially flush with each other, and a shifted position in which said front sides of said first and second lower rails are slightly offset from each other.

12. The router table and fence assembly according to claim 11, wherein said offset is created by having said front side of said first lower rail define a first line that is slightly forward of a second line defined by said front side of said second lower rail.

13. The router table and fence assembly according to claim 11, wherein said movement at least one of said first lower rail and said second lower rail between a normal position and a shifted position comprises rotation of said first lower rail.

14. The table and fence assembly according to claim 11 wherein:
  said movement between said normal position and said shifted position includes rotation of said first lower rail; and
  said first lower rail and said upper rail include a cooperating seating arrangement that includes dual slots and a single key for seating said first lower rail in either the normal position or the shifted position.

15. The router table and fence assembly according to claim 14 wherein said cooperating seating arrangement includes:
  said dual slots being located in said first lower rail, and extending in a generally longitudinal direction along an upper face of said first lower rail; and
  said single key being located in said upper rail, extending in a generally longitudinal direction and being offset from a central axis of a lower face of said upper rail.

16. The router table and fence assembly according to claim 11 further comprising:
  affixing means for attaching said first and second lower rails to said upper rail;
  wherein said affixing means is configured and arranged to allow at least one of said first and second lower rails to slide along said lower longitudinal axis with respect to said upper until said affixing means is tightened.

17. The router table and fence assembly according to claim 16, wherein said affixing means comprises a nut/bolt arrangement that is configured to fit within a T-slot that is located in each of said first and second lower rails.

18. A method for reconfiguring a router table fence assembly between a normal position and a shifted position, where the fence assembly includes a first lower rail configured and arranged to be positioned above a router table, said first lower rail defining a lower longitudinal axis along the length thereof; a second lower rail configured and arranged to be positioned above a router table along said lower longitudinal axis; said first lower rail and said second lower rail each including a front side that is configured and arranged to face a workpiece; and an upper rail configured and arranged to be attached to a router table above both said first lower rail and said second lower rail, whereby said upper rail defines an upper longitudinal axis that is substantially parallel to said lower longitudinal axis, the method comprising the steps of:
  separating said upper rail and said first lower rail from contact with each other; and
  rotating said first lower rail from a normal position, in which said front sides of said first and second lower rails are substantially flush with each other, to a shifted position in which said front sides of said first and second lower rails are slightly offset from each other.

19. The method according to claim 18, wherein said resulting offset comprises having said front side of said first rail define a first line that is slightly forward of a second line defined by said front side of said second rail.

20. The method according to claim 18, wherein said step of separating said upper rail and said first lower rail from contact with each other includes sliding said first lower rail with respect to said upper rail.

* * * * *